UNITED STATES PATENT OFFICE.

ERNST STERN, OF HANOVER, GERMANY, ASSIGNOR TO DEUTSCHE GASGLÜHLICHT AKTIENGESELLSCHAFT (AUERGESELLSCHAFT), OF BERLIN, GERMANY, A CORPORATION OF GERMANY.

WEIGHTED SILK AND PROCESS OF MAKING IT.

1,095,684.  Specification of Letters Patent.  Patented May 5, 1914.

No Drawing. Application filed November 6, 1913. Serial No. 799,529.

*To all whom it may concern:*

Be it known that I, ERNST STERN, a citizen of the German Empire, and a resident of Hanover, Germany, have invented certain new and useful Improvements in Weighted Silk and Process of Making It, of which the following is a specification.

My invention relates to the weighting of silk and has for its object to produce weighted silks of superior qualities by means of a novel process in which I utilize substances containing cerium or its equivalents as the weighting means.

There are a number of salts of the rare earths, found in large quantities and obtainable at comparatively small cost, which would theoretically appear to be serviceable for the weighting of silk but which in fact are of very little practical value. For instance, cerium which is easily obtainable in high percentage form and which possesses the characteristic that in the form of its chlorid solution, it is taken up by silk fibers or threads, is of little practical value for weighting silk because it gives to the silk threads a yellow-brown color. According to accepted scientific views cerium salts as such are regarded as useless because they oxidize in the air and therefore affect the threads deleteriously and this fact has prevented a practical or successful use of such salts even when combined with other rare earths (especially cerite earths) which oxidize difficultly in the atmosphere or which do not oxidize at all.

I have now found that silk can be weighted with cerium salts or their equivalents or such mixtures of such salts as would in themselves color the threads brown, when there are added to the cerium salts comparatively small amounts of tin salts, for example, in the form of chlorid or acetate. The cerium salt need not be chemically pure but may be employed in the condition in which it is supplied for ordinary technical processes. Whether the effect produced is due to purely chemical action or to physical-chemical action is not determined, but it is a fact that the addition of extremely small amounts of a tin salt to the cerium salt serves to produce a technically useful and valuable silk weighting process. This process results moreover in a superior product with respect both to the degree or grade of weighting and to the appearance and feel of the fabric fibers.

The following examples illustrate clearly the material rôle played by the addition of even very small percentages of tin salts in changing the entire character of the action of the cerium salts when employed alone.

Example I: A silk skein is first placed in a 40% solution of high percentage cerium chlorid; after standing about half an hour in such solution, the skein is hydrolyzed in water and is finally treated with a warm, 10% solution of sodium phosphate. The thread becomes colored a more or less brown color. The weight increase after about five passages is about 53%.

If in the above process approximately 2% of tin chlorid is added to the cerium chlorid solution, the threads appear as having an almost pure white color. If 4% of tin chlorid is added, a pure white color is obtained. With 8% of tin chlorid added, the purest white is obtained and, moreover, after five treatments, an increase in weight of 70% is produced. The favorable effect thus obtained by the addition of tin is attained not only with respect to cerium salt solutions but also with respect to zirconium salt solutions (for example, 20% of tin chlorid and 80% zirconium salt). This effect is also obtained when cerium salt mixtures are employed which are less rich in cerium but which contain didymium and lanthanum. Weighting with didymium and lanthanum alone would impart to the thread a pink or gray tint but this coloration is entirely avoided when relatively small amounts of tin are added to the cerium salts rich in didymium and lanthanum.

Example II: A silk skein is treated with a 40% solution of cerium-didymium chlorid to which has previously been added 20% tin chlorid which contains 23% oxid. After standing for about a half hour the skein is hydrolyzed in water after which it is treated with a warm, 10% solution of sodium phosphate. After about five passages an increase in weight of 93% is had.

Good results are also obtained if the rare earths, for example in the form of high percentage cerium salts, are in part replaced by zinc salts or beryllium salts.

The silk weighted in accordance with my process can be phosphated in the manner usual in the ordinary tin weighting process and can be subjected to the final silica treatment which, as is well known, contributes also to the weighting of the silk.

It will be seen that in my process it is the cerium which constitutes the weighting body, the tin being employed to make the use of cerium possible and industrially practical and not for the purpose of itself increasing the weight of the skein. Accordingly it is characteristic of this invention that the cerium is always quantitatively in excess of the tin.

When in my claims I refer to cerium, I mean to include also the equivalents thereof which as described may be zirconium or cerium containing other rare earths like didymium or lanthanum, or containing zinc or beryllium, and when I refer therein to zinc I mean to include also its equivalents such as beryllium.

I claim:

1. The process of weighting silk which consists in treating silk with a solution containing a cerium salt and a tin salt, substantially as described.

2. The process of weighting silk which consists in treating silk with a solution containing a cerium salt and a relatively small amount of a tin salt, substantially as described.

3. The process of weighting silk which consists in treating silk with a solution containing a cerium salt rich in didymium and lanthanum and a tin salt, substantially as described.

4. The process of weighting silk which consists in treating silk with a solution containing a cerium salt, a zinc salt and a tin salt, substantially as described.

5. The process of weighting silk which consists in treating silk with a solution containing a cerium salt rich in didymium and lanthanum, a zinc salt and a tin salt, substantially as described.

6. A weighted silk comprising silk and a substance associated with the fibers thereof which contains cerium as the weighting body, and also contains tin.

In testimony whereof I have hereunto set my hand in the presence of two subscribing witnesses.

ERNST STERN.

Witnesses:
T. HENDY REED,
ROBERT DENZER.